US008688495B2

(12) United States Patent
Tebbe et al.

(10) Patent No.: US 8,688,495 B2
(45) Date of Patent: Apr. 1, 2014

(54) ARCHITECTURAL DESIGN FOR TIME RECORDING APPLICATION SOFTWARE

(75) Inventors: Matthias Tebbe, Walldorf (DE); Otfried Von Geisau, Sinsheim (DE); Ralf Klein, Wiesloch (DE); Dieter Krisch, Karlsruhe (DE); Joachim Kenntner, Heidelberg (DE); Peter Fitz, Waldsee (DE); Peter J. Neumayer, Edenkoben (DE); Markus Biehler, Landau (DE); Kai-Michael Roesner, Eggenstein-Leopoldshafen (DE); Gerd Moosmann, Pforzheim (DE); Jens Freund, Heidelberg (DE); Peter Latocha, Malsch (DE); Stefan Kaetker, Dossenheim (DE)

(73) Assignee: SAP AG, Walldorf (DE)

( * ) Notice: Subject to any disclaimer, the term of this patent is extended or adjusted under 35 U.S.C. 154(b) by 1960 days.

(21) Appl. No.: 11/323,590

(22) Filed: Dec. 30, 2005

(65) Prior Publication Data
US 2007/0156493 A1 Jul. 5, 2007

(51) Int. Cl.
*G06Q 10/00* (2012.01)
*G07F 19/00* (2006.01)
*G07C 1/10* (2006.01)

(52) U.S. Cl.
USPC .......... 705/7.12; 705/7.23; 705/7.26; 705/30; 705/32

(58) Field of Classification Search
USPC ........................ 705/7.12, 7.23, 7.26, 30, 32
See application file for complete search history.

(56) References Cited

U.S. PATENT DOCUMENTS

| | | | |
|---|---|---|---|
| 5,560,005 A | 9/1996 | Hoover et al. | |
| 5,632,022 A | 5/1997 | Warran et al. | |
| 5,680,619 A | 10/1997 | Gudmundson et al. | |
| 5,768,119 A | 6/1998 | Havekost et al. | |
| 5,822,585 A | 10/1998 | Noble et al. | |
| 5,832,218 A | 11/1998 | Gibbs et al. | |

(Continued)

FOREIGN PATENT DOCUMENTS

| WO | WO 2004/083984 | 9/2004 |
|---|---|---|
| WO | WO 2005/114381 | 12/2005 |

OTHER PUBLICATIONS

Development of industrial information systems on the Web using business components Somjit Arch-int, Dentcho N Batanov. Computers in Industry. Amsterdam: Feb. 2003. vol. 50, Iss. 2; p. 231.*

(Continued)

*Primary Examiner* — Beth V Boswell
*Assistant Examiner* — Renae Feacher
(74) *Attorney, Agent, or Firm* — Fish & Richardson P.C.

(57) ABSTRACT

Methods, systems, and apparatus, including computer program products, for implementing a software architecture design for a software application implementing time recording. The application is structured as multiple process components interacting with each other through service interfaces, and multiple service interface operations, each being implemented for a respective process component. The process components include a Project Processing component that is responsible for structuring, planning, and executing measures or projects, a Time and Labor Management process component that supports the definition of employees' planned working time as well as the recording or the actual working times and absences, an Accounting process component that records relevant business transactions, and a Goods and Service Acknowledgement process component that includes the Goods and Service Acknowledgement business object, which is a document that states the recipient's obligation to pay the supplier for goods received or services rendered.

18 Claims, 5 Drawing Sheets

(56) References Cited

U.S. PATENT DOCUMENTS

| | | | |
|---|---|---|---|
| 5,848,291 A | | 12/1998 | Milne et al. |
| 5,867,495 A | * | 2/1999 | Elliott et al. ............... 370/352 |
| 5,881,230 A | | 3/1999 | Christensen et al. |
| 5,893,106 A | | 4/1999 | Brobst et al. |
| 5,987,247 A | | 11/1999 | Lau |
| 6,177,932 B1 | | 1/2001 | Galdes et al. |
| 6,272,672 B1 | | 8/2001 | Conway |
| 6,338,097 B1 | * | 1/2002 | Krenzke et al. ............. 719/329 |
| 6,424,991 B1 | | 7/2002 | Gish |
| 6,442,748 B1 | | 8/2002 | Bowman-Amuah |
| 6,445,782 B1 | | 9/2002 | Elfe et al. |
| 6,571,220 B1 | | 5/2003 | Ogino et al. |
| 6,609,100 B2 | | 8/2003 | Smith et al. |
| 7,050,056 B2 | | 5/2006 | Meyringer |
| 7,055,136 B2 | | 5/2006 | Dzoba et al. |
| 7,069,536 B2 | | 6/2006 | Yaung |
| 7,072,855 B1 | | 7/2006 | Godlewski et al. |
| 7,076,766 B2 | | 7/2006 | Wirts et al. |
| 7,181,694 B2 | | 2/2007 | Reiss et al. |
| 7,197,740 B2 | | 3/2007 | Beringer et al. |
| 7,219,107 B2 | | 5/2007 | Beringer |
| 7,222,786 B2 | | 5/2007 | Renz et al. |
| 7,257,254 B2 | | 8/2007 | Tunney |
| 7,406,716 B2 | | 7/2008 | Kanamori et al. |
| 2002/0103660 A1 | | 8/2002 | Cramon et al. |
| 2002/0138281 A1 | | 9/2002 | Cirulli et al. |
| 2002/0184111 A1 | | 12/2002 | Swanson |
| 2002/0198798 A1 | | 12/2002 | Ludwig et al. |
| 2002/0198828 A1 | * | 12/2002 | Ludwig et al. .............. 705/40 |
| 2003/0069774 A1 | | 4/2003 | Hoffman et al. |
| 2003/0083762 A1 | | 5/2003 | Farrah et al. |
| 2004/0034578 A1 | | 2/2004 | Oney et al. |
| 2004/0243489 A1 | | 12/2004 | Mitchell et al. |
| 2004/0254866 A1 | | 12/2004 | Crumbach et al. |
| 2004/0255152 A1 | | 12/2004 | Kanamori et al. |
| 2005/0108680 A1 | | 5/2005 | Cheng et al. |
| 2005/0144226 A1 | | 6/2005 | Purewal |
| 2005/0203813 A1 | | 9/2005 | Welter et al. |
| 2005/0216325 A1 | | 9/2005 | Ziad et al. |
| 2005/0235020 A1 | | 10/2005 | Gabelmann et al. |
| 2005/0246482 A1 | | 11/2005 | Gabelmann et al. |
| 2005/0256775 A1 | | 11/2005 | Schapler et al. |
| 2005/0256882 A1 | | 11/2005 | Able et al. |
| 2005/0257125 A1 | * | 11/2005 | Roesner et al. ............. 715/500 |
| 2005/0284934 A1 | | 12/2005 | Ernesti et al. |
| 2005/0288987 A1 | | 12/2005 | Sattler et al. |
| 2005/0289020 A1 | | 12/2005 | Bruns et al. |
| 2006/0053063 A1 | | 3/2006 | Nagar |
| 2006/0085294 A1 | | 4/2006 | Boerner et al. |
| 2006/0095439 A1 | | 5/2006 | Buchmann et al. |
| 2006/0248504 A1 | | 11/2006 | Hughes |
| 2006/0287939 A1 | | 12/2006 | Harel et al. |
| 2006/0288350 A1 | | 12/2006 | Grigorovitch et al. |
| 2007/0094098 A1 | | 4/2007 | Mayer et al. |
| 2007/0129964 A1 | | 6/2007 | Helmolt et al. |
| 2007/0129984 A1 | | 6/2007 | von Helmolt et al. |
| 2007/0129985 A1 | | 6/2007 | Helmolt et al. |
| 2007/0150387 A1 | | 6/2007 | Seubert et al. |
| 2007/0156430 A1 | | 7/2007 | Kaetker et al. |
| 2007/0156476 A1 | | 7/2007 | Koegler et al. |
| 2007/0156482 A1 | | 7/2007 | Bagheri |
| 2007/0156489 A1 | | 7/2007 | Berger et al. |
| 2007/0156499 A1 | | 7/2007 | Berger et al. |
| 2007/0156731 A1 | | 7/2007 | Ben-Zeev |
| 2007/0162893 A1 | | 7/2007 | Kaetker et al. |
| 2007/0168303 A1 | | 7/2007 | Kaetker et al. |
| 2007/0174068 A1 | | 7/2007 | Alfandary et al. |
| 2007/0174811 A1 | | 7/2007 | Kaetker et al. |
| 2007/0186209 A1 | | 8/2007 | Kaetker et al. |
| 2007/0198391 A1 | | 8/2007 | Dreyer et al. |
| 2007/0220046 A1 | | 9/2007 | Kaetker et al. |
| 2007/0234282 A1 | | 10/2007 | Prigge et al. |
| 2008/0215354 A1 | | 9/2008 | Halverson et al. |

OTHER PUBLICATIONS

Foley, J. (1996). Focus on business objects—the object management group wants to establish common ground for development. InformationWeek, 51. Retrieved from http://search.proquest.com/docview/229119816?accountid=14753.*

SAP introduces CRM, ERP and vertical industry packaged offerings for midmarket companies. (May 12, 2004).PR Newswire. Retrieved from http://search.proquest.com/docview/446796769?accountid=14753.*

Ip, W.H.; Chen, Bocheng; Lau, Henry and Sunjing, Wangqi, "An object-based relational data base system using re-configurable finance and material objects," Journal of Manufacturing Technology Management 15.8 (2004); 779-786.*

Leymann, F., & Roller, D. (1997). Workflow-based applications. IBM Systems Journal, 36(1), 102-123. Retrieved from http://search.proquest.com/docview/222412775?accountid=14753.*

Surveyer, J. (1996). The components of change—companies turn to prewritten software rather than code from scratch. InformationWeek, 0. Retrieved from http://search.proquest.com/docview/229123163?accountid=14753.*

Molina, Martin; Sierra, Jose L. and Cuena, Jose, "Reusable Knowledge-Based Components for Building Software Applications: Acknowledge Modeling Approach," International Journal of Software Engineering and Knowledge Engineering, vol. 9 No. 3 (1999), 297-317.*

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

Arch-int, S. et al.; "Development of Industrial Information Systems on the Web Using Busienss Components"; Computers in Industry; vol. 60; 2003; pp. 231-250.

Astudillo, H.; "How Conceptual System Architecture Leads to Business Process"; ACM; 2000; pp. 35-36.

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

Cowan, D.D. et al.; "Application Integration: Constructing Composite Applications from Interactive Components"; Software Practice and Experience; vol. 23, No. 3; Mar. 1993; pp. 255-275.

Deimel, A.; "The SAP R/3 Business Framework"; Software—Concepts & Tools; vol. 19, No. 1; 1998; pp. 29-36.

Fellner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Gauthier, P. and OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association International Conference; 1992; pp. 110-118.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

Linthicum, D.S.; "Chapter 9: RPCs, Messaging, and B2B Application Integration"; B2B Application Integration: E-Business Enable Your Enterprise; 2001; pp. 167-181.

(56) References Cited

OTHER PUBLICATIONS

Nori A.K. et al.; "Composite Applications: Process Based Application Development"; Lecture Notes in Computer Science; vol. 2444; Aug. 2003; pp. 48-53.
Pilhofer, F.; "Writing and Using CORBA Components"; Apr. 2002; http://www.fpx.de/MicoCCM/download/mico-ccm.pdf; 17 pages.
Ravichandran, T.; "Special Issue on Component-Based Software Development"; The Data Base for Advances in Information Systems; 2003; pp. 45-46.
SAP AG; "Designing Cross Solutions"; SAP XAPPS, [online]; Sep. 2003; pp. 1-2; http://www.sap.com/belux/platform/netweaver/pdf/BWP_CAF.pdf.
Schmid, H.A.; "Business Entity Components and Buisness Process Components"; Joop; vol. 12, No. 6; Oct. 1999; pp. 6-10, 12-15.
Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.
Singh, I. et al.; "Designing Enterprise Applications with the J2EE Platform, Second Edition"; Jun. 15, 2002.
Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.
Thomas, A.; "Enterprise JavaBeans Server Component Model for Java"; [online]; Dec. 1997; http://www.cs.indiana.edu/classes/b649-gann/ejb-white-paper.pdf.
Vergil Technology Ltd.; "Vergil Composite Application Builder Suite"; Product Datasheet [online]; 2003; pp. 1-5; http://www.webservicesmall.com.docs/VCAB_datasheet.pdf.
Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.
International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.
International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/323,041; Apr. 30, 2009; 25 pages.
Office Action issued in U.S. Appl. No. 11/322,612; May 11, 2009; 23 pages.
Office Action issued in U.S. Appl. No. 11/322,772; Mar. 25, 2009; 12 pages.
Office Action issued in U.S. Appl. No. 11/323,590; Jan. 9, 2009; 23 pages.
Office Action issued in U.S. Appl. No. 11/396,288; Jan. 2, 2009; 26 pages.
Office Action issued in U.S. Appl. No. 11/396,288; Apr. 15, 2008; 26 pages.
Anon,; "Sequenst Corp Bell Atlantic: Bell Atlantic Selects Sequent for Video-on-Demand Program; Sequent Moves to Sieze Opportunity in New Market"; Business Wire; Dec. 6, 1994.
Anon.; "State of the Art Reports™ 13,000 MAS 90® for Windows® Shipments in First Nine Months of Availability"; PR Newswire; Apr. 28, 1997.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyer's Guide to Software for Purchasing 2000.(Directory)"; Purchasing, vol. 129, No. 1; p. 179; Jul. 13, 2000.
"Hudson's Bay Company Realizes Fast ROI with the Oracle E-Business Suite"; PR Newswire; New York; Jan. 15, 2002; p. 1.
Office Action issued in U.S. Appl. No. 11/397,029; Jul. 21, 2009;28 pages.
Office Action issued in U.S. Appl. No. 11/323,040; Jul. 24, 2009; 35 pages.
Office Action issued in U.S. Appl. No. 11/322,816; Jul. 23, 2006; 41 pages.
Office Action issued in U.S. Appl. No. 11/322,851; Sep. 2, 2009; 32 pages.
Office Action issued in U.S. Appl. No. 11/322,482; Jan. 7, 2010; 19 pages.
Office Action issued in U.S. Appl. No. 11/322,772; Dec. 9, 2009; 14 pages.
Office Action issued in U.S. Appl. No. 11/323,039; Sep. 4, 2009; 36 pages.
Office Action issued in U.S. Appl. No. 11/323,634; Sep. 10, 2009; 15 pages.
Office Action issued in U.S. Appl. No. 11/322,383; Nov. 12, 2009; 29 pages.
Office Action issued in U.S. Appl. No. 11/396,258; Nov. 25, 2009; 9 pages.
Office Action issued in U.S. Appl. No. 12/333,085; Jun. 25, 2009; 9 pages.
Office Action issued in U.S. Appl. No. 11/396,288; Aug. 19, 2009; 20 pages.

* cited by examiner

ARCHITECTURAL DESIGN FOR TIME RECORDING APPLICATION SOFTWARE

BACKGROUND

The subject matter of this patent application relates to computer software architecture, and more particularly to the architecture of application software for time recording.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a software application.

The present invention can be implemented as methods, systems, and apparatus, including computer program products, for implementing a software architecture design for a software application implementing time recording. The application is structured as multiple process components interacting with each other through service interfaces, and multiple service interface operations, each being implemented for a respective process component. The process components include a Project Processing component that is responsible for structuring, planning, and executing measures or projects, a Time and Labor Management process component that supports the definition of employees' planned working time as well as the recording or the actual working times and absences, an Accounting process component that records relevant business transactions, and a Goods and Service Acknowledgement process component that includes the Goods and Service Acknowledgement business object, which is a document that states the recipient's obligation to pay the supplier for goods received or services rendered.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
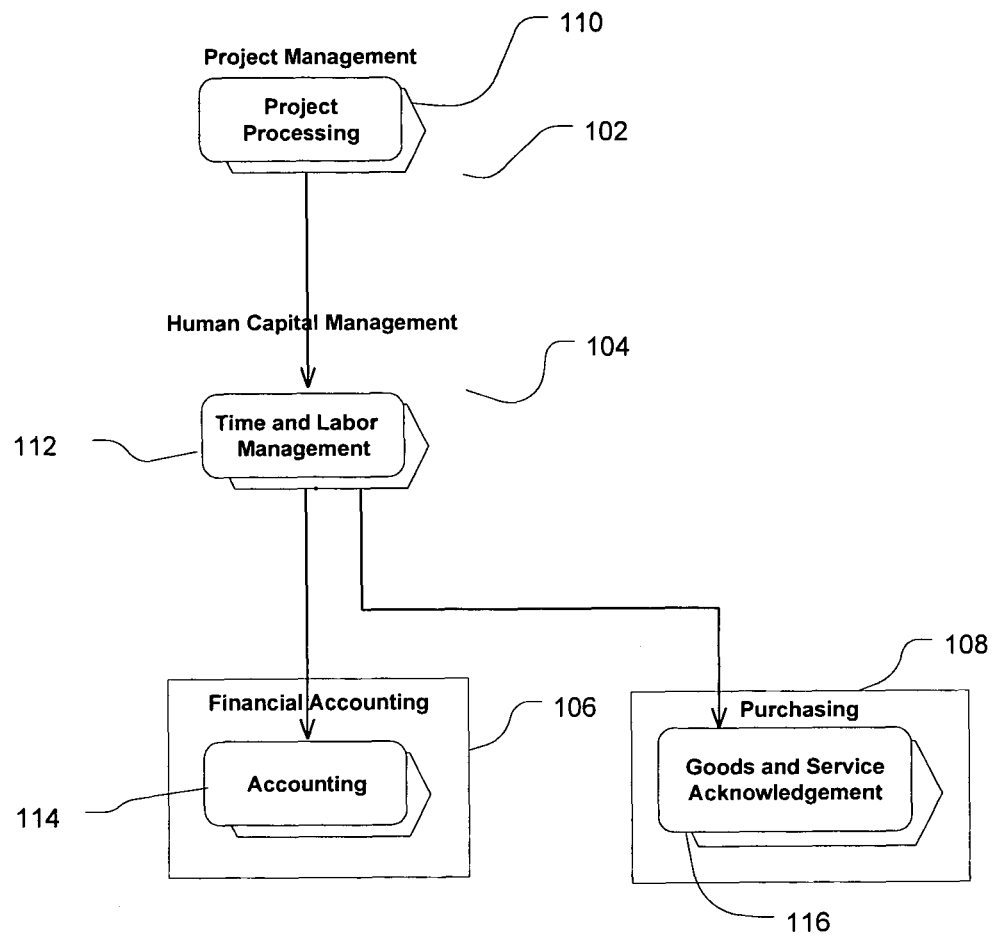
FIG. 1 is a block diagram of a software architectural design for a time recording software application.

FIG. 1 shows the software architectural design for a time recording software application. The time recording application is software that implements an end-to-end process used to define employees' planned working time as well as the recording of the actual working times, absences and their evaluations.

As shown in FIG. 1, the time recording design includes four deployment units: a Project Management unit 102, a Human Capital Management unit 104, a Financial Accounting unit 106, and a Purchasing unit 108.

The Project Management deployment unit 102 includes a Project Processing component 110 that is responsible for structuring, planning, and executing measures or projects (e.g., short-term measures, complex projects, etc).

The Human Capital Management deployment unit 104 includes a Time and Labor Management process component 112. The Time and Labor Management process component 112 supports the definition of employees' planned working time as well as the recording or the actual working times and absences and their evaluation.

The Financial Accounting deployment unit 106 includes an Accounting process component 114 that records all relevant business transactions.

The Purchasing deployment unit 108 includes a Goods and Service Acknowledgement process component 116 that includes the Goods and Service Acknowledgement business object. This is a document that states the recipient's (usually the purchaser's) obligation to pay the supplier for goods received or services rendered. An invoice is normally created after the goods and service acknowledgment has been confirmed.

Figure 2:
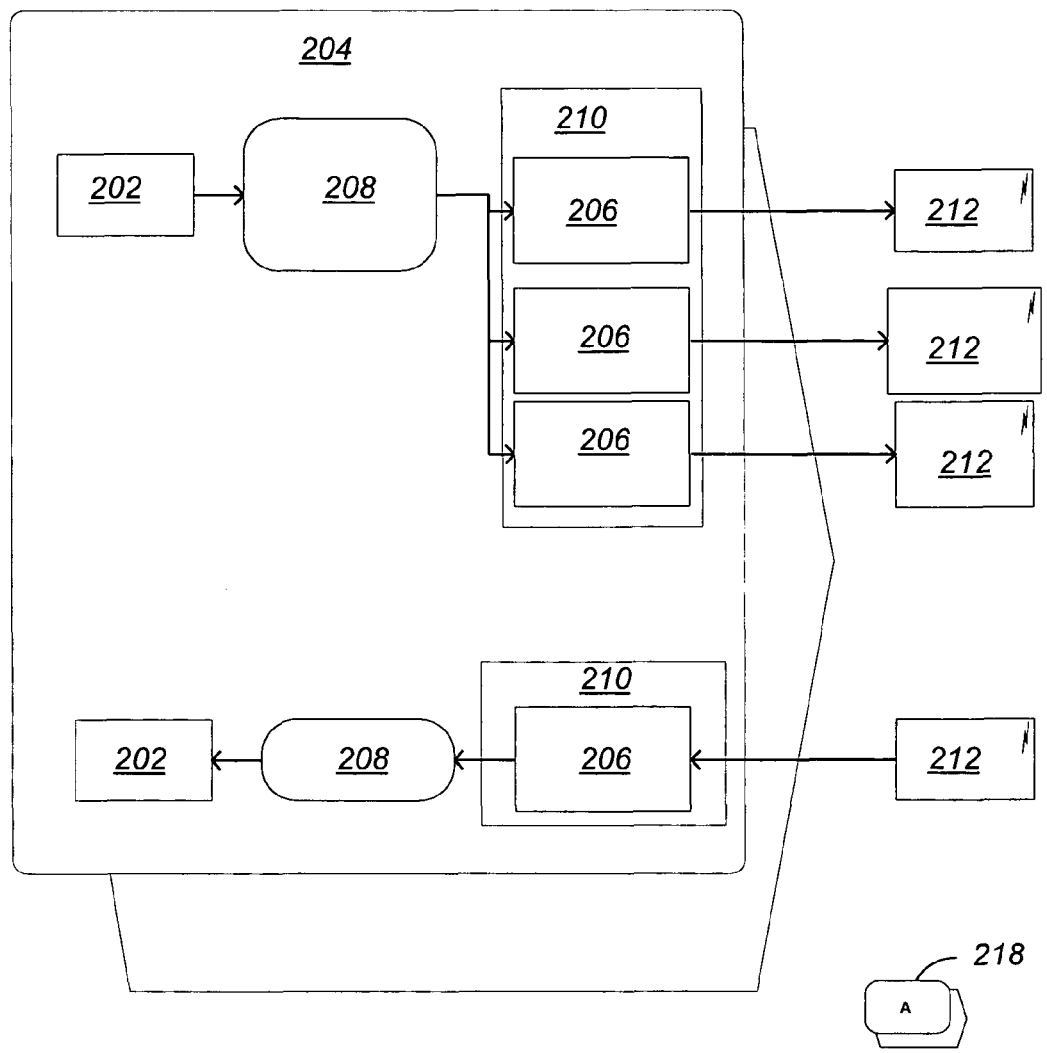
FIG. 2 illustrates the elements of the architecture as they are drawn in the figures of this patent application.
Figure 2:
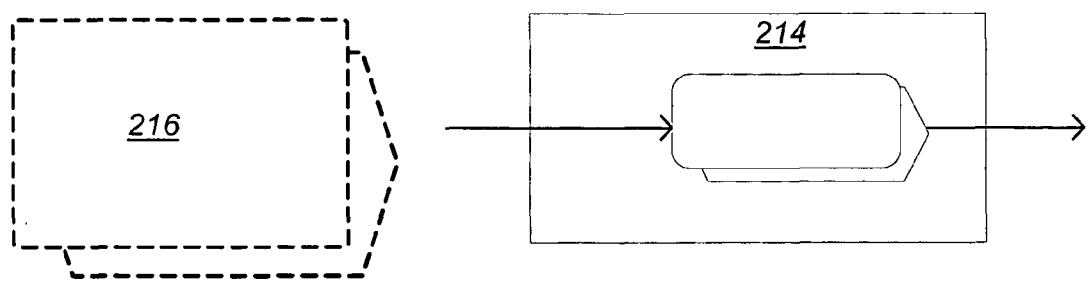

FIG. 2 illustrates the elements of the architecture as they are drawn in the figures of this patent application. The elements of the architecture include the business object (drawn as icon 202), the process component (drawn as icon 204), the operation (drawn as icon 206), the process agent (drawn as icon 208), the service interface or interface (drawn as icon 210), the message (drawn as icon 212), and the deployment unit (drawn as icon 214).

Not explicitly represented in the figures is a foundation layer that contains all fundamental entities that are used in multiple deployment units. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are assigned to their respective deployment unit.

A process component of an external system is drawn as a dashed-line process component (drawn as icon 216). Such a process component is used to represent the external system in describing interactions with the external system; however, this should be understood to require no more of the external system that it be able to produce and receive messages as required by the process component that interacts with the external system.

The connector icon 218 is used to simplify the drawing of interactions between process components.

Interactions between process component pairs involving their respective business objects, process agents, operations, interfaces, and messages are described as process component interactions, which determine the interactions of a pair of process components across a deployment unit boundary, i.e., from one deployment unit to another deployment unit. Interactions between process components are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components, but interfaces, process agents, and business objects that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. A process component is a software package that realizes a business process and generally exposes its functionality as services. The functionality contains business transactions.

A process component contains one or more semantically related business objects. Any business object belongs to no more than one process component.

Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters serving as a signature.

The architectural elements also include the service interface, referred to simply as the interface. An interface is a named group of operations. Each operation belongs to exactly one interface. An interface belongs to exactly one process component. A process component might contain multiple interfaces. In one implementation, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

Asynchronous outbound process agents are called after a business object changes, e.g., after a create, update, or delete of a business object instance.

Synchronous outbound process agents are generally triggered directly by a business object.

An output process agent will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement supports the operations of the original.

Process Component Interaction Model "Time and Labor Management" and "Accounting"

Figure 3:
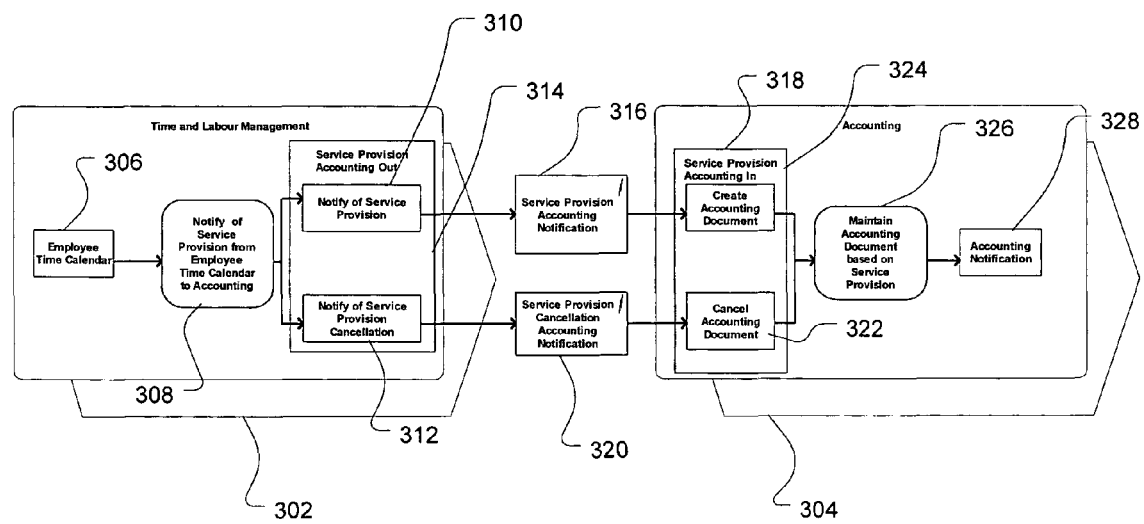
FIG. 3 is a block diagram showing interactions between a Time and Labor Management process component and an Accounting process component.

FIG. 3 is a block diagram showing interactions between a Time and Labor Management process component 302 and an Accounting process component 304 in the architectural design of FIG. 1.

The Time and Labor Management process component 302 includes an Employee Time Calendar business object 306 that gives a calendar based overview of different time data of an employee and their superpositions (e.g. illness vs. vacation). For example, the overview may detail planned working time, absences, and working time confirmation information. The Employee Time Calendar business object 306 may use a Notify of Service Provision from Employee Time Calendar to Accounting outbound process agent to invoke either a Notify of Service Provision operation 310 or a Notify of Service Provision Cancellation operation 312. Both operations are part of a Service Production Accounting Out interface 314.

The Notify of Service Provision operation 310 notifies Accounting about activity or resource consumption. The operation 310 may transmit a Service Provision Accounting Notification message 316 to a Create Accounting Document operation 318 in the Accounting process component 304. If a cancellation request is received, a Notify of Service Provision Cancellation operation 312 may transmit a Service Provision Cancellation Accounting Notification message 320 to a Cancel Accounting Document operation 322. The Create Accounting Document operation 318 and the Cancel Accounting Document operation 322 are both part of a Service Production accounting In Interface 324. A Maintain Accounting Document based on Service Provision inbound process agent 326 then updates an Accounting Notification business object 328.

Process Component Interaction Model "Time and Labor Management" and "Goods and Service Acknowledgement"

Figure 4:
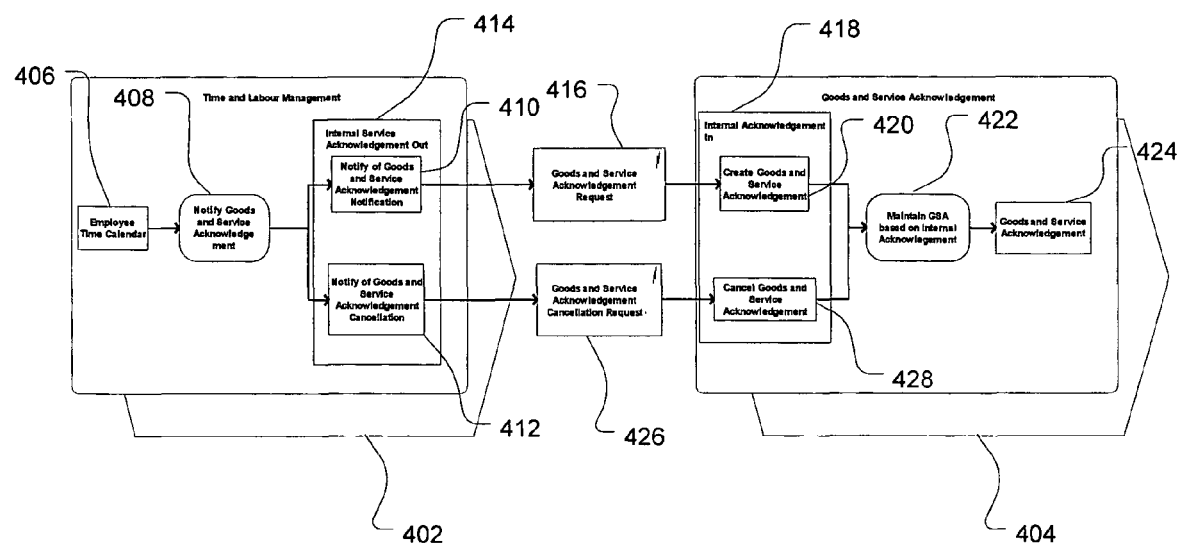
FIG. 4 is a block diagram showing interactions between a Time and Labor Management process component and a Goods and Service Acknowledgement process component.

FIG. 4 is a block diagram showing interactions between a Time and Labor Management process component 402 and a Goods and Service Acknowledgement process component 404 in the architectural design of FIG. 1.

The Time and Labor Management process component 402 includes an Employee Time Calendar business object 406. The Employee Time Calendar business object 406 may use a Notify Goods and Services Acknowledgement outbound process agent 408 to invoke a Notify of Goods and Service Acknowledgement Notification operation 410 or a Notify of Goods and Service Acknowledgement Cancellation operation 412, which are both included in the Internal Service Acknowledgement Out interface 414. The Notify of Goods and Service Acknowledgement Notification operation 410 notifies the Goods and Service Acknowledgement process component 404 of a service provided by an external employee. The Notify of Goods and Service Acknowledgement Notification operation 410 sends a Goods and Service Acknowledgement Request message 416 when an active employee time with goods and service acknowledgement relevant information is created or changed.

The Goods and Service Acknowledgement process component 404 receives the Goods and Service Acknowledgement Request message 416 via an Internal Acknowledgement In interface 418. Upon receipt of the Goods and Service Acknowledgement Request message 416, a Create Goods and Service Acknowledgement operation 420 is invoked to create Goods and service Acknowledgement, and Time and Labor Management by initiating a Maintain GSA (Goods and Service Acknowledgement) based on Internal Acknowledgment inbound process agent 422. The Maintain GSA based on Internal Acknowledgment inbound process agent 422 updates or creates a Goods and Service Acknowledgement business object 424 to report the receipt of goods and services. The Goods and Service Acknowledgement business object 424 may be used when employees of a company can confirm that they have received the goods and services they ordered through internal requests, purchasers, or designated recipients of goods and services, can confirm that they have received the goods and services they ordered on behalf of the employees for whom they are responsible, or suppliers or service providers can report that they have delivered the requested goods, or have rendered they requested services.

The Notify Goods and Services Acknowledgement outbound process agent 408 may also invoke the Notify of Goods and Service Acknowledgement Cancellation operation 412 to notify the Goods and Service Acknowledgement process component 404 of a cancellation of goods and services. The Notify of Goods and Service Acknowledgement Cancellation operation 412 sends a Goods and Service Acknowledgement Cancellation Request message 426 when an active employee time with Goods and Service Acknowledgement relevant information is cancelled. Upon receipt of the Goods and Service Acknowledgement Cancellation Request message 426, a Cancel Goods and Service Acknowledgement operation 428 is invoked to cancel a goods and services acknowledgement. Next, the Maintain GSA based on Internal Acknowledgment inbound process agent 422 updates the Goods and Service Acknowledgement business object 424 to report the cancellation of goods and services.

Process Component Interaction Model "Project Processing" and "Time and Labor Management"

Figure 5:
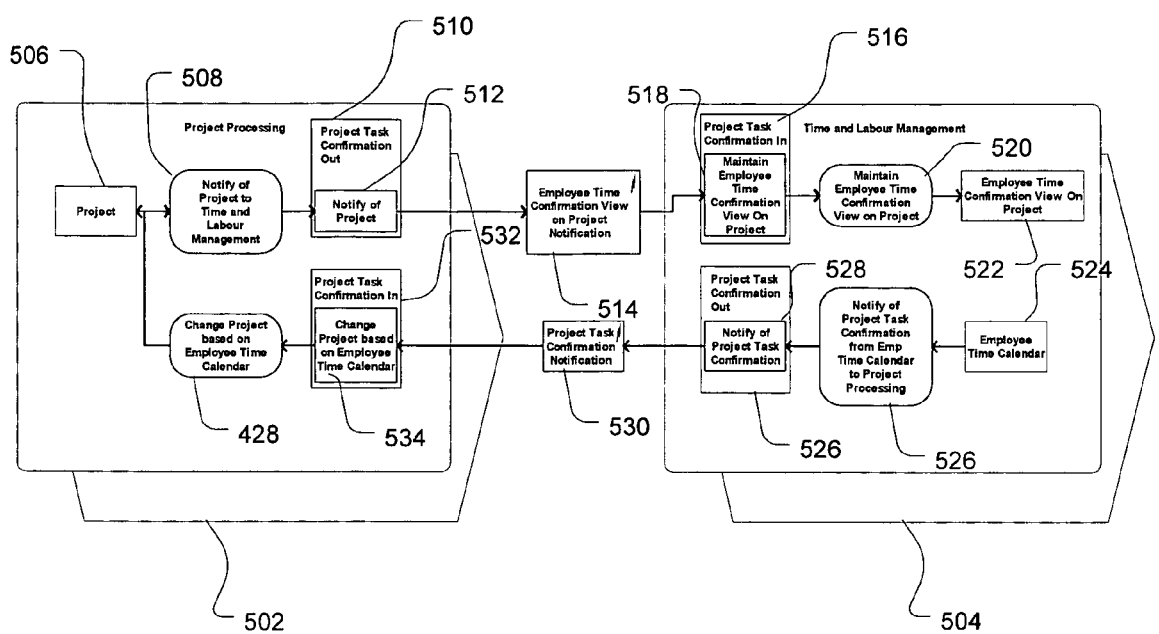
FIG. 5 is a block diagram showing interactions between a Project Processing process component and a Time and Labor Management process component.

FIG. 5 is a block diagram showing interactions between a Project Processing process component 502 and a Time and Labor Management process component 504 in the architectural design of FIG. 1.

The process component interaction model begins at the Project Processing process component 502 with a Project business object 506. The Project business object 506 is a business operation that contains an update. When the Project business object 506 is updated, a notification may be sent using a Notify of Project to Time and Labor Management outbound process agent 508. The Project Task Confirmation Out interface 510 includes a Notify of Project operation 512 that may publish or unpublish project tasks with assigned human resources. An Employee Time Confirmation View on Project Notification message 514 is sent to a Project Task Confirmation In interface 516 in the Time and Labor Management process component 504. A Maintain Employee Time Confirmation View On Project inbound process agent 520 may update an Employee Time Confirmation View on Project business object 522 based on changes of the object Project in the Project Processing process component 502. The Employee Time Confirmation View on Project business object 522 is a view on a project, adapted for the confirmation of employee times.

The Time and Labor Management process component 504 also includes an Employee Time Calendar business object 524. The Employee Time Calendar business object 524 gives a calendar based overview of different time data. A creation or cancellation of the Employee Time Calendar business object 524 may trigger a Notify of Project Task Confirmation from Employee Time Calendar to Project Processing process agent 526 to notify the Project Processing process component 502 of the creation or cancellation of the Employee Time Calendar business object 524. The Project Task Confirmation Out interface 526 includes a Notify of Project Task Confirmation operation 528 that may notify the Project Processing process component 502 of a project task confirmation or a project task status change. This notification is sent when an active employee time with project relevant information is created, changed or cancelled. A Project Task Confirmation Notification message 530 is sent to a Project Task Confirmation In interface 532 in the Project Processing process component 502. A Change Project based on Employee Time Calendar operation 534 may be invoked to confirm employee's working time for a project task, including working times and additional information such as status, short text, remaining work, etc. An update to the Project business object 502 is sent using a Change Project based on Employee Time Calendar inbound process agent 536.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims

What is claimed is:

1. A computer program product comprising application software encoded on a non-transitory tangible machine-readable medium, the application software being structured as process components interacting with each other through service interfaces, the software comprising:
    a plurality of process components, each of the process components comprising a modular and application-independent package of reusable granular software implementing a respective and distinct business process, the business process comprising functionality exposed by the process component, each of the process components including one or more business objects, the plurality of process components including:
    a Project Processing process component that is responsible for structuring, planning, and executing measures or projects;
    a Time and Labor Management process component that supports a definition of employees' planned working time as well as a recording of actual working times and absences;
    an Accounting process component that records relevant business transactions; and
    a Goods and Service Acknowledgement process component that includes a Goods and Service Acknowledgement business object, which is a document that states a recipient's obligation to pay a supplier for goods received or services rendered; and
    a plurality of service interface operations, each service interface operation being implemented for a respective process component, the operations comprising inbound and outbound operations, the outbound operation for a first process component being operable to send a message to a second process component of the plurality of process components, the second process component having an inbound operation for receiving the message, a passing of messages between an inbound and an outbound operation defining a message-based pair-wise interaction between the respective process components of the respective operations, the pair-wise interactions between pairs of the process components including interactions between:
    the Time and Labor Management process component and the Accounting process component;
    the Time and Labor Management process component and the Goods and Service Acknowledgement process component; and
    the Project Processing process component and the Time and Labor Management process component, wherein each of the plurality of process components is assigned to exactly one deployment unit among multiple deployment units, and each deployment unit is deployable on a separate computer hardware platform independent of every other deployment unit, and
    all interaction between a process component in one deployment unit and any other process component in any other deployment unit takes place through the respective service interfaces of the two process components.

2. The computer program product of claim 1, wherein the deployment units comprise:
    a Project Management deployment unit that includes the Project Processing component;
    a Human Capital Management deployment unit that includes the Time and Labor Management process component;
    a Financial Accounting deployment unit that includes the Accounting process component;
    a Purchasing deployment unit that includes the Goods and Service Acknowledgement process component.

3. The computer program product of claim 1, wherein:
    each business object comprises a representation of a type of a business entity described by a structural model; and
    none of the business objects of any one of the process components interacts directly with any of the business objects included in any of the other process components.

4. The computer program product of claim 3, wherein the business objects comprise a business process object.

5. The computer program product of claim 3, wherein:
    none of the business objects included in any one of the process components is included in any of the other process components.

6. The computer program product of claim 1, further comprising:
    a plurality of process agents, each process agent being either an inbound process agent or an outbound process agent, an inbound process agent being operable to receive a message from an inbound operation, an outbound process agent being operable to cause an outbound operation to send a message, each process agent being associated with exactly one process component, each operation comprising the smallest, separately-callable function having an input, an output, and at least one fault parameter.

7. The computer program product of claim 6, wherein:
the inbound process agents comprise a first inbound process agent operable to start the execution of step requested in a first inbound message by creating or updating one or more business object instances.

8. The computer program product of claim 6, wherein:
the outbound process agents comprise a first asynchronous outbound process agent that is called after a business object that is associated with the first outbound process agent changes.

9. The computer program product of claim 1, wherein the operations comprise synchronous and asynchronous operations.

10. A system, comprising:
a computer system comprising one or more hardware platforms for executing a computer software application;
a plurality of process components, each of the process components comprising a modular and application-independent package of reusable granular software implementing a respective and distinct business process, the business process comprising functionality exposed by the process component, each of the process components including one or more business objects, the plurality of process components including:
a Project Processing process component that is responsible for structuring, planning, and executing measures or projects;
a Time and Labor Management process component that supports a definition of employees' planned working time as well as a recording of actual working times and absences;
an Accounting process component that records relevant business transactions; and
a Goods and Service Acknowledgement process component that includes a Goods and Service Acknowledgement business object, which is a document that states a recipient's obligation to pay a supplier for goods received or services rendered; and
a plurality of service interface operations, each service interface operation being implemented for a respective process component, the operations comprising inbound and outbound operations, the outbound operation for a first process component being operable to send a message to a second process component of the plurality of process components, the second process component having an inbound operation for receiving the message, a passing of messages between an inbound and an outbound operation defining a message-based pair-wise interaction between the respective process components of the respective operations, the pair-wise interactions between pairs of the process components including interactions between:
the Time and Labor Management process component and the Accounting process component;
the Time and Labor Management process component and the Goods and Service Acknowledgement process component; and
the Project Processing process component and the Time and Labor Management process component, wherein
each of the plurality of process components is assigned to exactly one deployment unit among multiple deployment units, and each deployment unit is deployable on a separate computer hardware platform independent of every other deployment unit, and
all interaction between a process component in one deployment unit and any other process component in any other deployment unit takes place through the respective service interfaces of the two process components.

11. The system of claim 10, wherein:
each business object comprises a representation of a type of a business entity described by a structural model; and
none of the business objects of any one of the process components interacts directly with any of the business objects included in any of the other process components.

12. The system of claim 10, wherein:
none of the business objects included in any one of the process components is included in any of the other process components.

13. The system of claim 10, wherein:
a plurality of process agents, each process agent being either an inbound process agent or an outbound process agent, an inbound process agent being operable to receive a message from an inbound operation, an outbound process agent being operable to cause an outbound operation to send a message, each process agent being associated with exactly one process component, each operation comprising the smallest, separately-callable function having an input, an output, and at least one fault parameter.

14. The system of claim 10, the system comprising multiple hardware platforms, wherein:
the Project Processing component is deployed on a first hardware platform;
the Time and Labor Management process component is deployed on a second hardware platform;
the Accounting process component is deployed on a third hardware platform; and
the Goods and Service Acknowledgement process component is deployed on a fourth hardware platform.

15. The system of claim 14, wherein each of the first through the fourth hardware platforms are distinct and separate from each other.

16. A computer-implemented method for developing a computer software application, the method comprising the following steps performed by one or more processors:
generating, in a computer system, a digital data representation of an architectural design for a set of processes implementing an end-to-end application process, the design specifying a process component for each process in the set of processes, a plurality of process components, each of the process components comprising a modular and application-independent package of reusable granular software implementing a respective and distinct business process and each of the process components including one or more business objects, the business process comprising functionality exposed by the process component, the design specifying further specifying a set of process component interactions, wherein the specified process components include
a Project Processing process component that is responsible for structuring, planning, and executing measures or projects;
a Time and Labor Management process component that supports a definition of employees' planned working time as well as a recording of actual working times and absences;
an Accounting process component that records relevant business transactions; and a Goods and Service Acknowledgement process component that includes a Goods and Service Acknowledgement business object, which is a document that states a recipient's obligation to pay a supplier for goods received or services rendered; and the process component interactions include interactions between the Time and Labor Management process component and the Accounting process component;

the Time and Labor Management process component and the Goods and Service Acknowledgement process component; and the Project Processing process component and the Time and Labor Management process component; and developing, using at least one processor on the computer system and the generated design that includes the specified process components and the specified process component interactions, a computer software application to perform the set of processes, wherein each of the plurality of process components is assigned to exactly one deployment unit among multiple deployment units, and each deployment unit is deployable on a separate computer hardware platform independent of every other deployment unit, and all interaction between a process component in one deployment unit and any other process component in any other deployment unit takes place through the respective service interfaces of the two process components.

17. The method of claim 16, wherein:

each process in the set of processes is a business process transforming a defined business input into a defined business outcome.

18. The method of claim 17, further comprising: editing the generated design before using the generated design.

* * * * *